Sept. 15, 1942.    K. WÄGERLE    2,295,814

LAMINATED STRUCTURAL MATERIAL

Filed Nov. 29, 1938

Fig. 1.

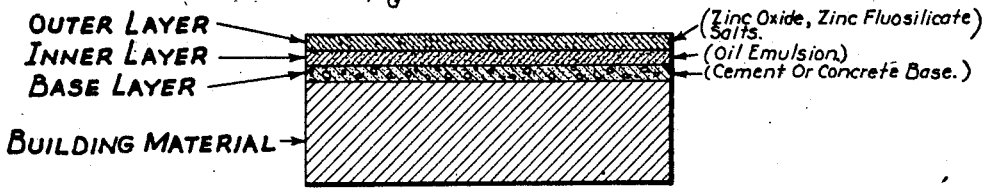

OUTER LAYER — (Zinc Oxide, Zinc Fluosilicate Salts.)
INNER LAYER — (Oil Emulsion)
BASE LAYER — (Cement Or Concrete Base.)
BUILDING MATERIAL

Fig. 2.

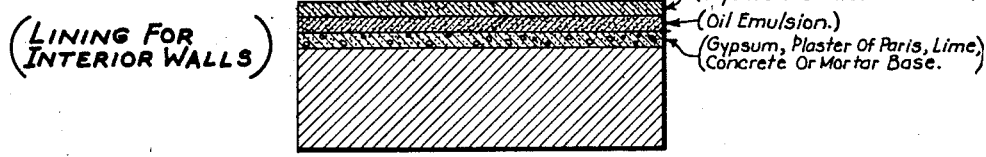

(LINING FOR INTERIOR WALLS)

(Zinc Oxide, Zinc Silico Fluoride, Fluor Spar Meal, Talcum, Cryolite and Bole.)
(Oil Emulsion.)
(Gypsum, Plaster Of Paris, Lime, Concrete Or Mortar Base.)

Fig. 3.

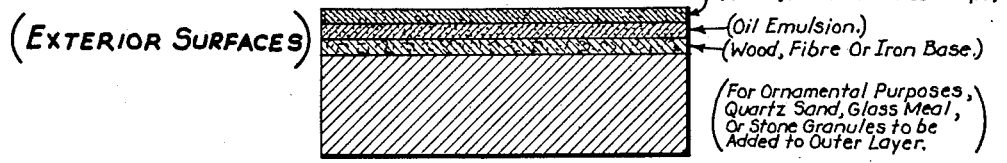

(EXTERIOR SURFACES)

(Zinc Oxide, Zinc Fluosilicate Salts, Mechanical Wood Pulp.)
(Oil Emulsion.)
(Wood, Fibre Or Iron Base.)
(For Ornamental Purposes, Quartz Sand, Glass Meal, Or Stone Granules to be Added to Outer Layer.)

Fig. 4.

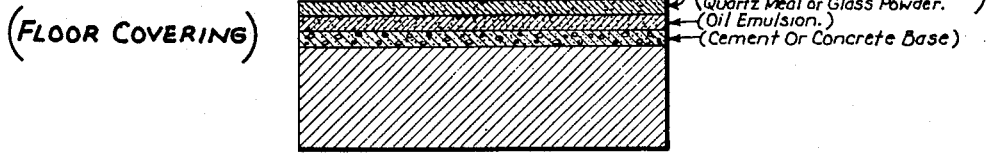

(FLOOR COVERING)

(Zinc Oxide, Zinc Fluosilicate Salts, Asbestos, Wood Meal, Paper Meal, Quartz Meal or Glass Powder.)
(Oil Emulsion.)
(Cement Or Concrete Base)

Fig. 5.

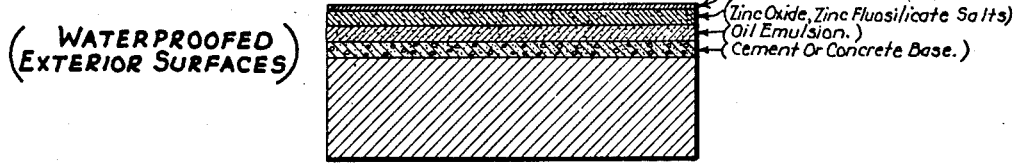

(WATERPROOFED EXTERIOR SURFACES)

Coating Bituminous Substance, Or Acetyl Cellulose Lacquer
(Zinc Oxide, Zinc Fluosilicate Salts)
(Oil Emulsion.)
(Cement Or Concrete Base.)

INVENTOR.
KARL WÄGERLE
BY
Richardson Geier
ATTORNEYS

Patented Sept. 15, 1942

2,295,814

UNITED STATES PATENT OFFICE 2,295,814

LAMINATED STRUCTURAL MATERIAL

Karl Wägerle, Ludwigsburg, Germany, assignor to Jacques Waitzfelder, New York, N. Y.

Application November 29, 1938, Serial No. 243,043
In Germany July 26, 1938

8 Claims. (Cl. 117—70)

Working or building materials are frequently manufactured with an outer surface structure such that an observer gains the impression that the entire work or building is of the same material as that of the surface. So manufactured, such materials must comply with the requirement that the individual layers of which the material consists shall remain firmly united with each other, even after long use of the building or working material; a merely local breaking away of the superficial layer will destroy completely the desired impression as to the composition of the whole structure. It has already been proposed to manufacture the coating upon artificial stone by the aid of a zinc-oxide-chloride-cement or putty, that is to say a cement or putty consisting of a mixture of zinc oxide with zinc chloride. The zinc chloride constitutes in the form in which it can be used for the preparation of cement or putty, an extraordinarily hydroscopic viscous mass which, when it is mixed with zinc oxide is hardened to a solid mass. With the intention of making the properties of this cement or putty usable for coating on artificial stone, the cement mass has been laid on with the addition of colouring oxides. These experiments, however, give no serviceable result, as the coatings are easily loosened from the base. At the same time, the zinc chloride absorbs efficaciously the moisture existing in the mass.

It has now been found possible to prevent individual layers from stripping-off as has so frequently been observed in the case of multi-layer building materials, and to create satisfactory multi-layer building materials of very good appearance, by covering an underlayer consisting for example of mortar, plaster, stone or artificial stone, cardboard, mechanical wood pulp, wood and so forth with a second layer which controls the passage of water and which consists preferably of an oil emulsion. It can also be composed of solutions of organic and inorganic materials which, after drying reduces the absorptive capacity of the underlayer to such an extent that sucking off of the water from the third and last layer of the building material is now prevented, or at least reduced, to such an extent that an essential modification of concentration does not occur. This second layer is covered by a third layer which consists of zinc oxide intimately mixed with zinc fluosilicate salts and is worked up before the appliance of water to a cementitious mass. The multi-layer building material obtained in this way is very durable, and even after many years' use, despite atmospheric or other noxious influences known to affect building and working materials deleteriously, no change or stripping of layers takes place.

The zinc oxide which is used for the manufacture of the third and outermost layer of the multi-layer building or working material, is conveniently in finely powdered form. Mineral filling substances and if necessary also colouring oxides may be added. After the admixture of the zinc fluosilicate salts and of a corresponding quantity of water, the mass hardens quickly, and is then resistant to heat and also to moisture. Sometimes it is desirable to reduce slightly the velocity at which the mass hardens. For this purpose retarding means such as borax or sal ammoniac can be added to the mass before the layering. Preferably 2% to 5% of this substance is added for the indicated purpose to this mixture.

It has been already proposed to manufacture lustrous upper surfaces on building bodies, by covering with a packing coating (condensing coating) and a subsequent treating the latter with a mass of fluate and milk of lime, so that the upper surface is polished. Such working of building bodies could not, however, by any means obtain a multi-layer resistant building or working material. The upper surface treatment could not prevent the decomposition of the building material or a stripping of the masses. Only the present invention has shown the way how to obtain not only weatherproof, but also heatproof building and working materials.

As an example, for the building up of the described working and building material a triple layer building material is described below, the base layer of which consists of a cement plate. Upon the thoroughly cleaned plate an oil emulsion is first laid as a water insulating layer. The coating is carried out by means of a brush or sprinkling device. After the second layer has dried, this being preferably carried out in a well ventilated space, it is coated with a third layer composed as follows:

| | Parts |
|---|---|
| Zinc oxide | 25–35 |
| Zinc fluosilicate | 8–11 |
| Fluor spar meal | 17–21 |
| Talcum | 1– 2 |

This mass can be tinted by the admixture of colouring oxides. The mixture with the addition of the required quantity of water is laid on the second layer by means of a spatula. As soon as the mass has reached a sufficient solidity, it is treated with the polish tools until the desired lustre is obtained. After 4 or 5 hours the entire building and working material is completely unbound and has the property which is already mentioned above.

For certain purposes it is sometimes valuable to impart a special hardening to the outer surface of the multi-layer building or working material obtained by this means. For example, if it is the question of an exterior coating which is subjected to severe strain, one can then obtain an extraordinarily great hardening of the outer surface by one or several rinsings with concentrated zinc fluosilicate solution of approximately 40° Bé., the lustre of which is extraordinarily constant.

The new working material is suited as a lining for interior walls, and for this purpose it is produced preferably with gypsum, plaster of Paris, lime, concrete or mortar mixture as a base layer. When applied in this manner, it is preferable to produce the outermost layer by the addition of cryolite or bole. The mass from which the third layer is constituted then has the following composition:

|  | Grammes |
|---|---|
| Zinc oxide | 400–450 |
| Crystallized zinc fluosilicate | 170–180 |
| Fluor spar meal | 200–230 |
| Talcum | 45– 60 |
| Cryolite | 66– 71 |
| Bole | 20– 30 |

When it is a question of use for exterior surfaces, the particular weather stability of the building material comes into consideration, also light building plates of any desirable composition, for example, composition sheets of various cellulosic materials or wood fibre plates can form the base layer for the new working or building substance.

The base layer can be formed not only of walls of plaster, but also of wood or iron. Particularly in the latter case, but also in the employment of wood as an underlayer, mechanical wood pulp can be added to the third layer. By this means is obtained not only a solid connection with the underlayer, which with the passing of time is severely subjected to external influences, but also an intimate binding within the individual layers, so that a stripping is effectively prevented. Metallic underlayers expand differently according to the temperature conditions. If, however, in the outer layer mechanical wood pulp or other fibrous materials are embedded, such movement does not cause splitting of the outermost layer. The same may be said for wood as an underlayer, because wood works equally by a drying process or by absorption of moisture. If the new building material is employed as an ornament for the façades of houses, sand, for example, quartz sand or glass meal or other stone granules, is advantageously added to the third layer.

Furthermore, the new building and working pieces are suited for use as floor coverings. Although the conditions to which a floor covering is subjected are particularly unfavourable as regards wear, the building substance in accordance with the present invention stands up to heavy demands. When the material is to be used for this purpose, it is advantageous to add to the third layer substances which give it a certain elasticity, for example asbestos, wood meal, paper meal, or filling substances such as glass powder or quartz meal.

The new building material may be used also for table plates, window sills, coverings for heating bodies, fountain covers, vases, commodity articles of various kinds such as writing materials, clock housings etc. In this case the third layer conveniently includes in addition to the substances already indicated quartz meal, glass meal or wood meal, whilst special reinforcements of iron, wood or wire may advantageously be embedded in the third layer.

Finally, the working material is suited for all underlayers, the surfaces of which are to be provided with an elastic protecting coating. For this purpose a composition is suitably selected for the third layer in which the mass consists of zinc oxide, zinc fluosilicate and alkylated cellulose or dimethyl cellulose dissolved in water.

For the internal lining of dwelling rooms and of cupboards, for example refrigerators and other similar purposes, cardboard is chosen as the underlayer of the working material. By an appropriate treatment of the third layer the surface can easily be given a ribbed leatherlike appearance, or again a smooth marble surface. The additional substances to be added to the base, and consisting of zinc oxide and zinc fluosilicate, can be described in regard to their effectiveness as follows:

The fluor spar bestows on the third layer a greater hardness. If talcum is added, the surface can be smoothed very simply, the retardation of the unbinding is achieved through borax, whilst cryolite imparts to the third layer a certain translucence such as occurs for example in certain kinds of marble or alabaster. The mechanical wood pulp or other fibrous materials are easily grindable and have high elasticity, for which reason the mass is suitable in an extraordinary manner as a spatula mass. Sand quartz or glass meal, as well as granular stone, not only increases the hardness of the third layer, but also vary the structure. The introduction of asbestos improves the grip and in consequence the firmness of tread. At the same time this filling substance and other fibrous materials affect the sound deadening and in consequence give to the new working piece particularly valuable properties in this direction. The alkylated cellulose or di-methyl cellulose under the influence of zinc fluosilicate, is transformed during the hardening of the stone mass into a substance with fibrous structure. By this means the third layer is permeated with fine fibres which extend also into the second layer and cause a particularly intimate compound so that any splitting is prevented.

All the forms which have been indicated of the new building working material in accordance with the present invention can be made waterproof by a special treatment of the surface with a bituminous substance. The described building and working material is resistant to acids, fats and the like to the highest degree. If one desires to render it completely insensitive to the influence of diluted acids or fat, it is sufficient to provide the upper surface with a coating such as lacquer, for example acetyl cellulose lacquer, in order to produce the desired effect. The third layer has the pecularity of firmly retaining such lacquers even if they are laid on as extremely tenuous films, and such films have a good capacity of resistance.

The last described mass can be employed also as a vitreous cement; its composition is then similar to the spatula mass.

Upon the accompanying drawing, in Figures 1 to 4, are shown diagrammatically, different laminated structures which may be prepared according to the present invention, the legends being fully descriptive.

What I claim is:

1. A laminated constructional element comprising a first layer forming a base, a second layer applied thereto and composed of moisture-resisting material, and a third layer comprising a mixture of zinc oxide with fluosilicate of zinc, which mixture is formed into a paste with water, applied to the second layer and allowed to harden.

2. A laminated constructional element comprising a first layer forming a base, a second layer applied thereto and composed of moisture-resisting material, and a third layer comprising a mixture of zinc oxide, fluosilicate of zinc and fluor spar, which mixture is formed into a paste with water, applied to the second layer and allowed to harden.

3. A laminated constructional element comprising a first layer forming a base, a second layer applied thereto and composed of moisture-resisting material, and a third layer comprising a mixture of zinc oxide, fluosilicate of zinc and talcum, which mixture is formed into a paste with water, applied to the second layer and allowed to harden.

4. A laminated constructional element comprising a first layer forming a base, a moisture-resisting second layer and a third layer which is applied to the second layer and comprises a mixture of zinc oxide, fluosilicate of zinc and cryolite.

5. A laminated constructional element comprising a first layer forming a base, a second layer applied thereto and composed of a moisture-resisting material, and a third layer comprising a paste formed by zinc oxide, fluosilicate of zinc, a filler, a water soluble alkyl cellulose and water, the paste thereupon being applied to the second layer and allowed to harden.

6. A laminated constructional element comprising a first layer forming a base, a second layer applied thereto and composed of moisture-resisting material, and a third layer comprising a reaction product of zinc oxide with fluosilicate of zinc.

7. A laminated constructional element comprising a first layer forming a base, a second layer applied thereto and composed of moisture-resisting material, a third layer comprising a reaction product of zinc oxide with fluosilicate of zinc, and a water soluble alkyl cellulose.

8. A laminated constructional element comprising a base having a water resisting coating and an outer layer comprising a water soluble alkali cellulose fluor spar and the reaction product of zinc oxide and fluosilicate of zinc.

KARL WÄGERLE.